US012647763B2

(12) United States Patent
Khallil et al.

(10) Patent No.: US 12,647,763 B2
(45) Date of Patent: Jun. 2, 2026

(54) DYNAMICALLY AND LOCALLY ADJUSTING WIRELESS NETWORK COVERAGE IN RESPONSE TO EMERGENCY SERVICES NOTIFICATIONS

(71) Applicant: AT&T Intellectual Property I, L.P., Atlanta, GA (US)

(72) Inventors: Wasib Khallil, Lilburn, GA (US); Bhumit Patel, Woodstock, GA (US); Tanvi Alam, Roswell, GA (US); Jonathan Chang, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 353 days.

(21) Appl. No.: 18/395,451

(22) Filed: Dec. 22, 2023

(65) Prior Publication Data

US 2025/0211960 A1      Jun. 26, 2025

(51) Int. Cl.
| | |
|---|---|
| *H04W 4/00* | (2018.01) |
| *H04B 17/29* | (2015.01) |
| *H04W 4/90* | (2018.01) |
| *H04W 24/02* | (2009.01) |
| *H04W 64/00* | (2009.01) |

(52) U.S. Cl.
CPC .............. H04W 4/90 (2018.02); H04B 17/29 (2015.01); H04W 24/02 (2013.01); H04W 64/00 (2013.01)

(58) Field of Classification Search
CPC ........ H04W 4/90; H04W 24/02; H04W 64/00
See application file for complete search history.

(56) References Cited

U.S. PATENT DOCUMENTS

| | | | | |
|---|---|---|---|---|
| 2012/0100824 A1* | 4/2012 | Michael | .................. | H04W 4/90 |
| | | | | 455/404.1 |
| 2015/0288819 A1* | 10/2015 | Brown | ................... | G08B 25/00 |
| | | | | 379/45 |
| 2017/0169699 A1* | 6/2017 | Will | ......................... | H04W 4/90 |
| 2017/0206238 A1* | 7/2017 | Coutinho | ............. | H04W 4/021 |
| 2018/0376357 A1* | 12/2018 | Tavares Coutinho et al. | ............. | |
| | | | | H04W 64/003 |
| 2020/0229069 A1* | 7/2020 | Chun | ..................... | H04W 76/30 |
| 2021/0084436 A1* | 3/2021 | Sutherland | .......... | H04L 63/0853 |
| 2021/0204164 A1* | 7/2021 | Yavuz | ................... | H04L 47/781 |
| 2021/0328934 A1* | 10/2021 | Guim Bernat | ......... | H04L 47/24 |
| 2025/0071040 A1* | 2/2025 | Wang | ..................... | G16Y 40/50 |

* cited by examiner

*Primary Examiner* — Abdelnabi O Musa

(57) ABSTRACT

A method includes detecting data relating to an event for which emergency services have been requested, wherein the data includes at least one of: voice data, audio data, text data, image data, or video data, identifying a geographic location of the event, wherein the geographic location is within a coverage area of a wireless network, predicting, based on the data, an urgency level associated with the event, identifying a set of minimum conditions of the wireless network that is associated with the urgency level of the event, determining that current conditions of the wireless network at the location do not satisfy the minimum conditions, determining an adjustment to the wireless network that, when deployed, will cause the current conditions of the wireless network at the location to satisfy the minimum conditions, and sending at least one instruction to an element of the wireless network to deploy the adjustment.

20 Claims, 3 Drawing Sheets

100

100

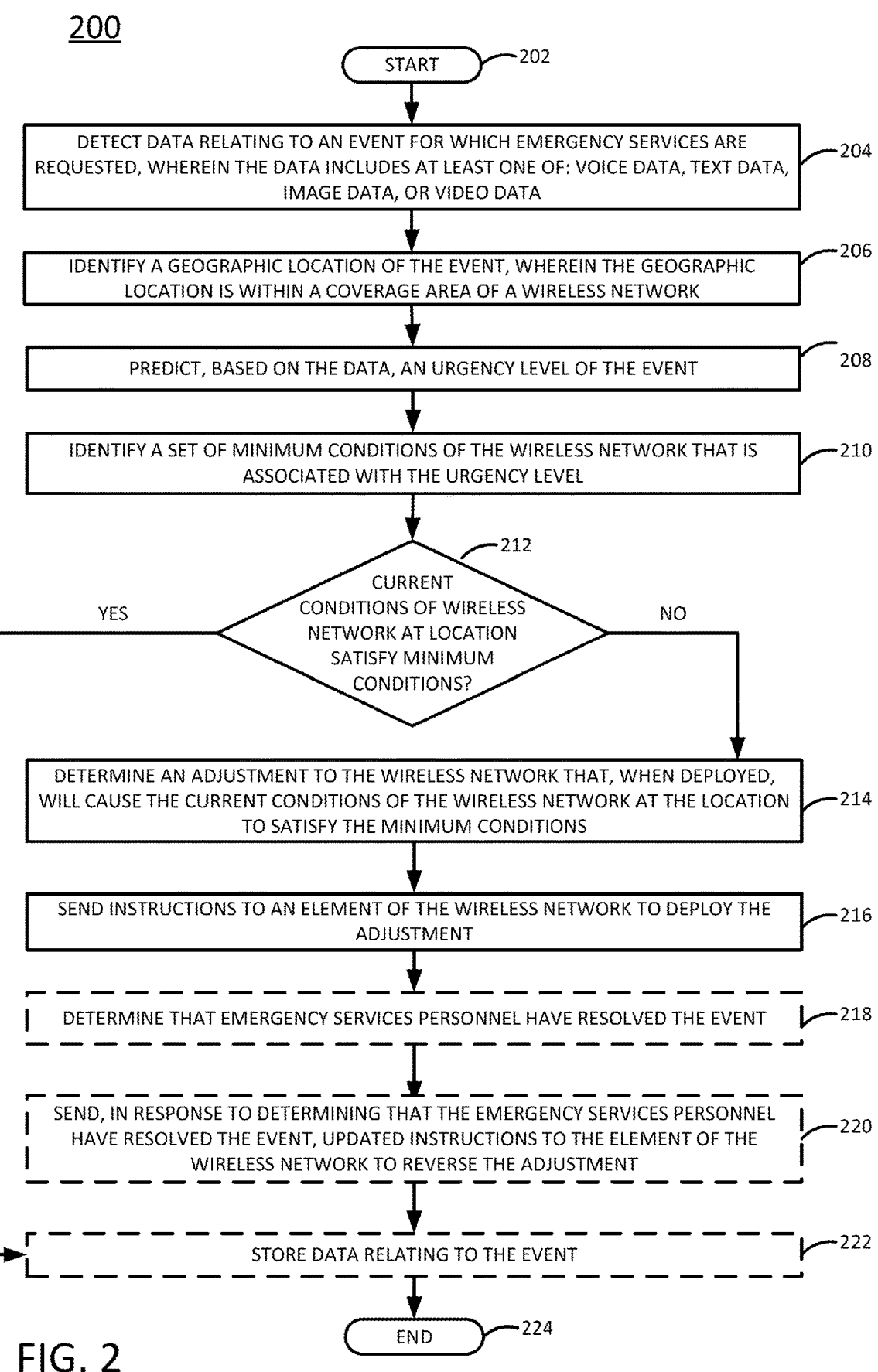

200

START — 202

DETECT DATA RELATING TO AN EVENT FOR WHICH EMERGENCY SERVICES ARE REQUESTED, WHEREIN THE DATA INCLUDES AT LEAST ONE OF: VOICE DATA, TEXT DATA, IMAGE DATA, OR VIDEO DATA — 204

IDENTIFY A GEOGRAPHIC LOCATION OF THE EVENT, WHEREIN THE GEOGRAPHIC LOCATION IS WITHIN A COVERAGE AREA OF A WIRELESS NETWORK — 206

PREDICT, BASED ON THE DATA, AN URGENCY LEVEL OF THE EVENT — 208

IDENTIFY A SET OF MINIMUM CONDITIONS OF THE WIRELESS NETWORK THAT IS ASSOCIATED WITH THE URGENCY LEVEL — 210

CURRENT CONDITIONS OF WIRELESS NETWORK AT LOCATION SATISFY MINIMUM CONDITIONS? — 212

YES

NO

DETERMINE AN ADJUSTMENT TO THE WIRELESS NETWORK THAT, WHEN DEPLOYED, WILL CAUSE THE CURRENT CONDITIONS OF THE WIRELESS NETWORK AT THE LOCATION TO SATISFY THE MINIMUM CONDITIONS — 214

SEND INSTRUCTIONS TO AN ELEMENT OF THE WIRELESS NETWORK TO DEPLOY THE ADJUSTMENT — 216

DETERMINE THAT EMERGENCY SERVICES PERSONNEL HAVE RESOLVED THE EVENT — 218

SEND, IN RESPONSE TO DETERMINING THAT THE EMERGENCY SERVICES PERSONNEL HAVE RESOLVED THE EVENT, UPDATED INSTRUCTIONS TO THE ELEMENT OF THE WIRELESS NETWORK TO REVERSE THE ADJUSTMENT — 220

STORE DATA RELATING TO THE EVENT — 222

END — 224

DYNAMICALLY AND LOCALLY ADJUSTING WIRELESS NETWORK COVERAGE IN RESPONSE TO EMERGENCY SERVICES NOTIFICATIONS

The present disclosure relates generally to wireless communications networks, and relates more particularly to devices, non-transitory computer-readable media, and methods for dynamically and locally adjusting wireless network coverage in response to emergency services notifications.

BACKGROUND

Next-generation 911 (NG911) and similar services allow users contacting emergency services to provide emergency responders with text, images, and video in addition to voice calls. This allows emergency responders to better prioritize and prepare when responding to emergency situations such as vehicular accidents, natural disasters, and the like.

SUMMARY

In one example, the present disclosure describes a device, computer-readable medium, and method for dynamically and locally adjusting wireless network coverage in response to emergency services notifications. For instance, in one example, a method performed by a processing system including at least one processor includes detecting data relating to an event for which emergency services have been requested, wherein the data includes at least one of: voice data, audio data, text data, image data, or video data, identifying a geographic location of the event, wherein the geographic location is within a coverage area of a wireless network, predicting, based on the data, an urgency level associated with the event, identifying a set of minimum conditions of the wireless network that is associated with the urgency level of the event, determining that current conditions of the wireless network at the location do not satisfy the minimum conditions, determining an adjustment to the wireless network that, when deployed, will cause the current conditions of the wireless network at the location to satisfy the minimum conditions, and sending at least one instruction to an element of the wireless network to deploy the adjustment.

In another example, a non-transitory computer-readable medium stores instructions which, when executed by the processing system, cause the processing system to perform operations. The operations include detecting data relating to an event for which emergency services have been requested, wherein the data includes at least one of: voice data, audio data, text data, image data, or video data, identifying a geographic location of the event, wherein the geographic location is within a coverage area of a wireless network, predicting, based on the data, an urgency level associated with the event, identifying a set of minimum conditions of the wireless network that is associated with the urgency level of the event, determining that current conditions of the wireless network at the location do not satisfy the minimum conditions, determining an adjustment to the wireless network that, when deployed, will cause the current conditions of the wireless network at the location to satisfy the minimum conditions, and sending at least one instruction to an element of the wireless network to deploy the adjustment.

In another example, a system includes a processing system including at least one processor and a non-transitory computer-readable medium storing instructions which, when executed by the processing system, cause the processing system to perform operations. The operations include detecting data relating to an event for which emergency services have been requested, wherein the data includes at least one of: voice data, audio data, text data, image data, or video data, identifying a geographic location of the event, wherein the geographic location is within a coverage area of a wireless network, predicting, based on the data, an urgency level associated with the event, identifying a set of minimum conditions of the wireless network that is associated with the urgency level of the event, determining that current conditions of the wireless network at the location do not satisfy the minimum conditions, determining an adjustment to the wireless network that, when deployed, will cause the current conditions of the wireless network at the location to satisfy the minimum conditions, and sending at least one instruction to an element of the wireless network to deploy the adjustment.

BRIEF DESCRIPTION OF THE DRAWINGS

The teachings of the present disclosure can be readily understood by considering the following detailed description in conjunction with the accompanying drawings, in which:

FIG. 2 illustrates a flowchart of an example method for dynamically and locally adjusting wireless network coverage in response to emergency services notifications, according to the present disclosure.

To facilitate understanding, identical reference numerals have been used, where possible, to designate identical elements that are common to the figures.

DETAILED DESCRIPTION

In one example, the present disclosure provides a system, method, and non-transitory computer readable medium for dynamically and locally adjusting wireless network coverage in response to emergency services notifications. As discussed above, next-generation 911 (NG911) and similar services allow users contacting emergency services to provide emergency responders with text, images, and video in addition to voice calls. This allows emergency responders to better prioritize and prepare when responding to emergency situations such as vehicular accidents, natural disasters, and the like. Although emergency responders are provided with priority access to wireless communications networks (e.g., via differentiated routing or the like), the same is generally not true for users who are trying to contact the emergency responders. Moreover, emergency responders are not always guaranteed a particular Quality of Service (QOS) despite the priority access. Thus, although a user may, in theory, be able to send text, photos, or video to emergency responders, in reality, if the user is calling from a physical location in which the wireless network coverage is poor, the user may be unable to provide emergency responders with the information to facilitate a better emergency response.

Examples of the present disclosure deploy temporary adjustments to wireless network resources in the geographic locations of events requiring emergency services, such as vehicular accidents, medical emergencies, and natural disasters. These temporary adjustments will ensure that users who are present at the geographic locations of the events will have access to fast and reliable wireless services. Access to a fast and reliable network service will help facilitate effective communication between emergency services and the users requesting assistance from the emergency services. Fast and reliable network service will also allow the users to access NG911 and/or similar services, so that the users are able to share vital information with emergency responders, thereby ensuring timely responses to emergency events. Once an emergency event has been resolved by emergency services personnel, the temporary adjustments may be reversed or undone to conserve network resources.

In further examples, machine learning techniques may be used to predict when specific geographic locations may be in need of enhanced wireless service. For instance, the machine learning techniques may detect that events requiring emergency services may be more likely to occur in certain locations on certain days of the week, at certain times of the day, during certain weather conditions or events, or the like. In these cases, the network conditions in the certain locations may be proactively adjusted, before emergency services are actually requested. These and other aspects of the present disclosure are discussed in further detail with reference to FIGS. 1-3, below.

Figure 1:
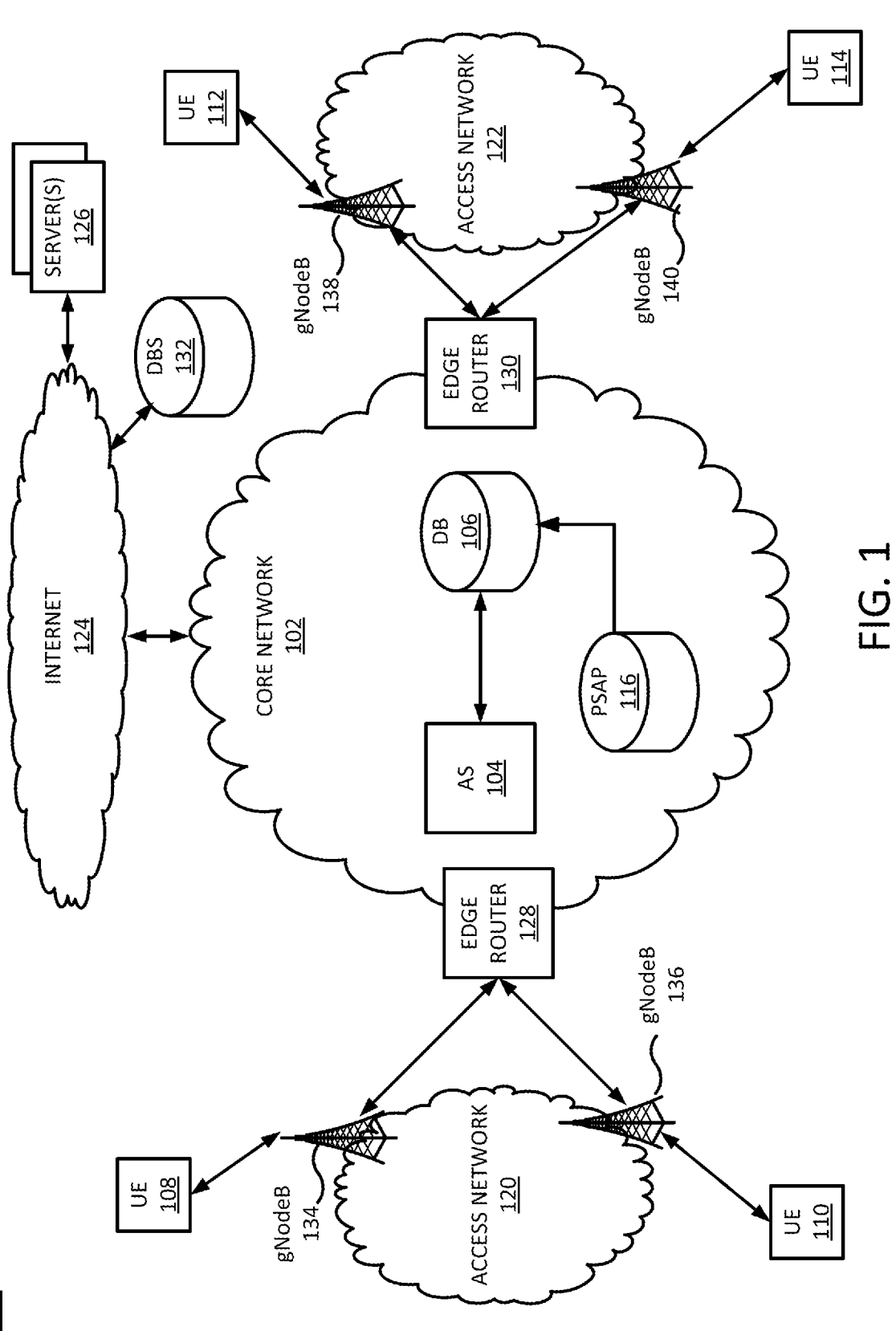
FIG. 1 illustrates an example system in which examples of the present disclosure for dynamically and locally adjusting wireless network coverage in response to emergency services notifications may operate.

To further aid in understanding the present disclosure, FIG. 1 illustrates an example system 100 in which examples of the present disclosure for dynamically and locally adjusting wireless network coverage in response to emergency services notifications may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VOIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3rd party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 300 depicted in FIG. 3, and may be configured as described below. For example, the user endpoint devices 108, 110, 112, and 114 may each comprise a smart phone, a tablet computer, a laptop computer, a gaming device, a wearable smart device (e.g., a smart watch, a head mounted display, or the like), an IoT device, a bank or cluster of such devices, and the like. In a further example, at least one of the user endpoint devices 108, 110, 112, or 114 may be part of a public safety support center (PSSC) or emergency services response system. In one example, any one of the user endpoint devices 108, 110, 112, and 114 may be operable to run an application that may communicate with the server(s) 126 or other application servers in the system 100, as discussed in greater detail below.

In one example, one or more servers 126 and one or more databases 132 may be accessible to user endpoint devices 108, 110, 112, and 114 via Internet 124 in general. The server(s) 126 and DBs 132 may be associated with Internet software applications that may exchange data with the user endpoint devices 108, 110, 112, and 114 over the Internet 124. In one example, at least some of the servers 126 and DBs 132 host machine learning models that are trained to estimate the urgency of events that are reported to emergency services and to determine a set of minimum resources of the system 100 that should be provided to help emergency services communicate with users who are present at the sites of the events.

In accordance with the present disclosure, the AS 104 may be configured to provide one or more operations or functions in connection with examples of the present disclosure for dynamically and locally adjusting wireless network coverage in response to emergency services notifications. For instance, in one example, the AS 104 may detect when a voice or data call is placed to an emergency services (e.g., PSSC) system.

When the AS 104 detects that a call has been placed to an emergency services system, the AS 104 may extract data from the call. The extracted data may include, for example, voice or other audio data, text data, image data, and/or video data. The AS 104 may execute a machine learning model to which the extracted data is provided as input. The machine learning model may be trained to predict, based on data extracted from voice and data calls to emergency services systems, urgency levels associated with events that are reported in the voice and data calls. For instance, the machine learning model may predict an urgency level of a vehicular accident based at least in part on images of the vehicular accident that are provided via a data call.

The AS 104 may determine a set of minimum network conditions that should be satisfied, based on the urgency level that is predicted for the event associated with the voice or data call. For instance, each possible urgency level may be associated with or mapped to a predefined set of minimum network resources, where the set of minimum network resources may specify, for example, a minimum bandwidth, a maximum latency, a minimum radio frequency signal strength, a maximum packet loss, and/or the like. The set of minimum network resources may be designed to ensure the ability to provide a QoS that is commensurate with the urgency level of the event.

The AS 104 may also determine a location of the event. In one example, the location of the event may be determined by identifying a cellular base station (e.g., a gNodeB) via which the user endpoint device 108, 110, 112, or 114 is connected to the emergency services system. For instance, in FIG. 1, the access network 120 includes base stations 134 and 136, while the access network 122 includes the base stations 138 and 140. Thus, as an example, the AS 104 may determine that a call to emergency services that was placed by the user endpoint device 108 connected through the base station 134. Packets containing voice and other data sent by the user endpoint device 108 may include a base station identifier associated with the base station 134, which may allow the AS 104 to identify the base station 134 and pinpoint the geographic location of the user endpoint device 108.

The AS 104 may also determine the location from the content of the data extracted from the voice or data call. For instance, where the extracted data includes image or video data, the AS 104 may be able to determine the location from street signs, landmarks, or other items depicted in the image and video data. Where the extracted data includes audio data or text data, the AS 104 may detect a name of a location or an address that is contained in the audio data or text data. The location could also be determined from ambient noise in audio data, such as the sound of a train or airplane, or track or gate announcements.

Once the AS 104 has determined the location of the event and the set of minimum network conditions required by the urgency level of the event, the AS 104 may determine whether the current network conditions at the location of the event satisfy the set of minimum network conditions. For instance, the AS 104 may retrieve, from the DB 106 or 132, measurements of key performance indicators of the system 100. The AS 104 may compare these key performance indicators to any threshold values of the key performance indicators that are specified by the set of minimum network conditions.

If the current network conditions at the location of the event do not satisfy the set of minimum network conditions, then the AS 104 may determine an adjustment that may be made to the system 100 that will result in the current network conditions at the location of the event satisfying the set of minimum network conditions. For instance, the adjustment may include using beamforming, adjusting a tilt angle of a base station antenna or a signal strength of a base station antenna, or blocking new network traffic in a cell covered by a base station that is closest to the location of the event. The AS 104 may then send instructions to one or more network elements in the network to deploy the adjustments.

In one example, the AS 104 may further connect to a public safety answering point (PSAP) database 116 or a similar data source. The PSAP DB 116 may monitor the status of requests for emergency services and may include updated status information for each request or related event (e.g., en route (e.g., emergency services have been dispatched), in progress (e.g., emergency services are on location and in the process of responding), resolved (e.g., emergency services have finished responding), or some other status). Thus, once the AS 104 has instructed one or more network elements to deploy the adjustments, the AS 104 may track the status of the event using data stored in the PSAP DB 116. When the AS 104 has determined that the event has been resolved, the AS 104 may send updated instructions to the one or more network elements to reverse or undo the adjustments.

In some examples, the AS 104 may store information related to each voice or data call to emergency services, including a nature of the event reported, a time of the call, a date of the call, a geographic location of the event, and an urgency level of the event. This information may be used to periodically re-train the machine learning model that is used to predict the urgency level of reported events. This information could also be used to train a machine learning model to predict when events requiring a response by emergency services may be more likely to occur (e.g., specific days of the week, times of day, locations, weather conditions, and/or the like that are more frequently associated with events requiring emergency services). Being able to predict when such events are most likely to occur may allow the AS 104 to proactively instruct network elements to make adjustments that will ensure network conditions are commensurate with the urgency level of any likely or expected events.

In one example, at least one of the DBs 106 or 132 may store information about historical events that required emergency services. As discussed above, the stored information may be used to train the machine learning model to predict the urgency level of an event, based on features extracted from a voice or data call in which the event is reported. At least one of the DBs 106 or 132 may also store key performance indicators for different geographic locations within the system 100 (e.g., for different base stations 134, 136, 138, and 140), such as bandwidth, latency, throughput, packet loss, data speed, radio frequency signal strength, and the like. These key performance indicators may be periodically refreshed based on updated measurements reported by network probes and/or other sensors. As discussed above, these key performance indicators may be used by the AS 104 to determine whether the current network conditions in a specific geographic location that is covered by the network satisfy a set of minimum network conditions needed to support users involved in an event at the specific geographic location that requires emergency services.

Figure 3:
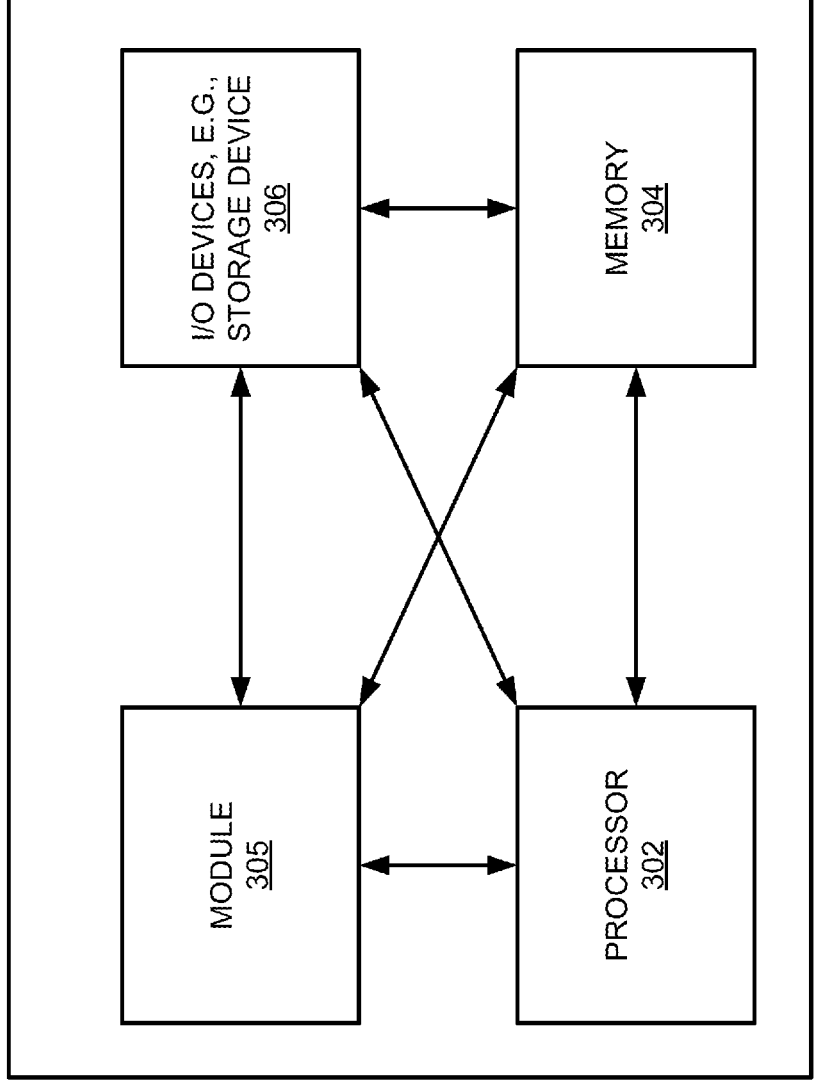
FIG. 3 depicts a high-level block diagram of a computing device specifically programmed to perform the functions described herein.

The AS 104 may comprise one or more physical devices, e.g., one or more computing systems or servers, such as computing system 300 depicted in FIG. 3, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for dynamically and locally adjusting wireless network coverage in response to emergency services notifications, as described herein. For instance, an example method for dynamically and locally adjusting wireless network coverage in response to emergency services notifications is discussed in further detail below in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

To further aid in understanding the present disclosure, FIG. 2 illustrates a flowchart of an example method 200 for dynamically and locally adjusting wireless network coverage in response to emergency services notifications, according to the present disclosure. In one example, the method 200 may be performed by the AS 104 or by another element of the core network 102 illustrated in FIG. 1. However, in other examples, the method 200 may be performed by another device, such as the computing system 300 of FIG. 3, discussed in further detail below. For the sake of discussion, the method 200 is described below as being performed by a processing system (where the processing system may comprise a component of the AS 104 or by another element of the core network 102, the computing system 300, or another device).

The method 200 begins in step 202. In step 204, the processing system may detect data relating to an event for which emergency services have been requested, wherein the data includes at least one of: voice data, audio data, text data, image data, or video data.

In one example, a cellular base station (e.g., a gNodeB) of a wireless communications network detects when a user endpoint device connects, through the cellular base station, to an emergency services system. The emergency services system may comprise, for instance, a call system of a 911 dispatch center, a police station, a fire station, a first aid station, a hospital, a doctor's office, an urgent care center, or the like.

The emergency services may be requested through a call comprising a voice call and/or a data session, where the data session may include a video call, a short messaging service (SMS) session, a chatbot session, or the like. Thus, as discussed above, the data may include at least one of: voice data, audio data, text data, image data, or video data. For instance, voice data may include utterances spoken by a user of the user endpoint device that initiated the call to request emergency services. Audio data may include audio recorded (e.g., by the user endpoint device) from a location of the user endpoint device that does not include utterances, such as crowd noise, vehicular noise, or other ambient noise. Text data may include any text data provided by the user of the user endpoint device, such as via an SMS or chatbot session. Image data may include still images captured (e.g., by the user endpoint device) from a location of the user endpoint device, such as images of a vehicular accident, an injury, a natural disaster, or another event or object. Video data may include video images captured (e.g., by the user endpoint device) from a location of the user endpoint device, such as images of a vehicular accident, an injury, a natural disaster, or another event or object. In some examples, the data may be provided in response to a request from the emergency services system or a human operator of the emergency services system. For instance, the emergency services system (or human operator) may ask a user who has called to report a vehicular accident to send a photo of an intersection at which the accident occurred.

In step 206, the processing system may identify a geographic location of the event, wherein the geographic location is within a coverage area of the wireless network. In one example, the geographic information may be provided by the cellular base station through which the user endpoint device connected to the emergency services system. For instance, the cellular base station may be able to pinpoint geographic (e.g., latitude and longitude) coordinates of the user endpoint device. In one example, the cellular base station may geotag the data with these coordinates before providing the data to the processing system.

In another example, the geographic information may be inferred from the content of the data. For instance, speech recognition and/or natural language processing techniques may be used to extract the geographic location (e.g., an address or intersection) from an utterance made by the user of the user endpoint device. Other audio processing techniques may be used to analyze audio data that does not include user utterances, such as crowd noise, vehicular noise, background or ambient noise, or the like, but which may be used to help pinpoint the geographic location (e.g., an announcement from a subway platform or an airport gate). In another example, image recognition techniques may be used to extract a location from a still or video image (e.g., by analyzing text from a street sign or matching an image of a building, such as a landmark, a stadium, a park, or the like, to a stored image).

In step 208, the processing system may predict, based on the data, an urgency level associated with the event. In one example, the urgency level may be predicted by extracting features from the data relating to the event and providing those features as inputs to a machine learning model (e.g., a support vector machine, a random forest model, a linear regression model, a neural network, or the like). The machine learning model may be trained to predict (and generate as an output), based on the input features, an urgency level of the event.

For instance, for event involving a vehicular accident, features extracted from image data may include a number of vehicles involved in the vehicular accident or a location of the vehicular accident relative to other vehicular traffic (e.g., whether the vehicular accident occurred in the middle of a busy highway, on the shoulder of a rural road, or the like). Features extracted from voice, audio, or text data may include a number of occupants of each vehicle involved in the vehicular accident, whether any of the occupants of the vehicles involved in the vehicular accident are likely to require medical attention, a severity of the vehicular accident (e.g., whether the accident was a "fender bender," the type of vehicles involved, e.g., a passenger car, a tractor trailer, or a school bus, whether any of the vehicles are no longer drivable, or the like).

In one example, the urgency level predicted by the processing system may fall into one of a plurality of predefined categories, such as "low urgency," "medium urgency," "high urgency," or "highest urgency." In another example, the urgency level predicted by the processing system may comprise a numerical score that falls along some predefined scale (e.g., a scale of one through ten). In one example, the machine learning model may be trained using labeled training data, where the labeled training data comprises features extracted from historical emergency events and requests for emergency services and human or machine generated labels associated with the features that indicate, for each feature, a likely urgency level that can be inferred from the feature. By processing this training data, the machine learning model may learn the most likely level of urgency associated with different features of events.

In a further example, machine learning model may also take as inputs the time at which the request for emergency services was made, the geographic location from which the request for emergency services originated and weather conditions at the geographic location at the time at which the emergency services were requested. This information may help the machine learning model to learn when particular locations and/or times of day may be more likely to be associated with conditions requiring emergency services (e.g., weekday rush hours on busy highways, blizzard conditions on geographically remote roads, or the like). As discussed in further detail below, the ability to learn which conditions or combinations of conditions may be more likely to lead to a need for emergency services may help the processing system to proactively adjust network parameters before emergency services are actually requested, leading to quicker response times.

In step 210, the processing system may identify a set of minimum conditions of the wireless network that is associated with the urgency level of the event. In one example, the set of minimum conditions may set a threshold value for at least one key performance indicator of the wireless network, such as a minimum bandwidth, a maximum latency, a minimum radio frequency signal strength, a maximum packet loss, or the like. In one example, each set of minimum conditions may correspond to a different slice of the wireless network.

In one example, the minimum conditions may vary based on an urgency of the event. For instance, as discussed above, the processing system may predict an urgency level associated with the event, and the urgency level may fall into one of a plurality of predefined categories or along a predefined scale. In one example, each category or location on the scale may be associated with a separate set of minimum conditions. For instance, a "low" urgency level event may be associated with a first set of minimum conditions, a "medium" urgency level event may be associated with a second set of minimum conditions, and a "high" urgency level event may be associated with a third set of minimum conditions. The first set of minimum conditions may include, for example, a first minimum bandwidth, which may be lower than a second minimum bandwidth included in the second set of minimum conditions. The third set of minimum conditions may include a third minimum bandwidth that is higher than both the first minimum bandwidth and the second minimum bandwidth.

In step 212, the processing system may determine whether current conditions of the wireless network at the location satisfy the minimum conditions. For instance, as discussed above, the minimum conditions may set a threshold value for at least one key performance indicator of the wireless network. Thus, the current conditions of the wireless network may comprise currently measured values of the at least one key performance indicator (e.g., bandwidth, latency, radio frequency signal strength, packet loss, etc.). In order to satisfy the minimum conditions, the current conditions must be at least equal to the minimum conditions. For instance, if the minimum conditions specify a minimum bandwidth, then the current bandwidth must be no lower than (but could be higher than) the minimum bandwidth. If the minimum conditions specify a maximum latency, then the current latency must be no higher than (but could be lower than) the maximum latency. If the minimum conditions specify a minimum radio frequency signal strength, then the current minimum radio frequency signal strength must be no lower than (but could be higher than) the minimum radio frequency signal strength. If the minimum conditions specify a maximum packet loss, then the current packet loss must be no higher than (but could be lower than) the maximum packet loss.

If the processing system concludes in step 212 that the current conditions of the wireless network at the location do not satisfy the minimum conditions, then the method 200 may proceed to step 214. In step 214, the processing system may determine an adjustment to the wireless network that, when deployed, will cause the current conditions of the wireless network at the location to satisfy the minimum conditions.

In one example, the adjustment may comprise one or more actions that, when taken, will ensure that all conditions of the minimum conditions are satisfied by the current conditions of the wireless network. In one example, the one or more actions may include actions that can be carried out by one or more elements of the wireless network, such as base stations, repeaters, edge routers, application servers, or the like.

For instance, in one example, the one or more actions may include at least one of: adjusting an angle or tilt of an antenna of a base station of the wireless network, adjusting a signal direction of an antenna of a base station of the wireless network, adjusting a signal strength of an antenna of a base station of the wireless network, or the like. In further examples, beamforming may also be used to enhance radio frequency signal strength in the geographic location of the event. In further examples, the one or more actions may also include limiting or blocking incoming traffic that does not originate at the geographic location of the event or from emergency services at certain wireless network elements (e.g., cellular base stations).

In one example, the one or more actions may be generated as outputs of a machine learning model (e.g., a support vector machine, a random forest model, a linear regression model, a neural network, or the like) that has been trained to predict, based on the current network conditions, the minimum conditions, the geographic location of the event, and the time at which emergency services were requested, a set of adjustments to network parameters that will result in the current conditions satisfying the minimum conditions.

In step 216, the processing system may send instructions to an element of the wireless network to deploy the adjustment. In one example, the processing system may send the instructions to the element that must act in order to deploy the adjustment. For instance, if the adjustment involves adjusting an angle or tilt of an antenna of a base station of the wireless network, adjusting a signal direction of an antenna of a base station of the wireless network, or adjusting a signal strength of an antenna of a base station of the wireless network, then the instructions may be sent to the base station of which the antenna is a part. The instructions, when executed at the element, may cause the adjustment to be deployed and the current conditions of the wireless network to change.

In optional step 218 (illustrated in phantom), the processing system may determine the emergency services personnel have resolved the event. In one example, the processing system may monitor a public safety answering point (PSAP) database or other data sources that track the status of events requiring response by emergency services. For instance, an entry in a PSAP may identify, for a given event, at least one of: a geographic location of the event, a nature of the event (e.g., vehicular accident, medical emergency, natural disaster, etc.), the type of emergency services required (e.g., fire, ambulance, police, etc.), or a status of the event. The status of the event may comprise one of: reported (e.g., emergency services have been requested), dispatched (e.g., emergency services are en route), in progress (e.g., emergency services are on location and in the process of responding), resolved (e.g., emergency services have finished responding), or some other status.

In optional step 220 (illustrated in phantom), the processing system may send, in response to determining that the emergency services personnel have resolved the event, updated instructions to the network element to reverse the adjustment. For instance, the conditions of the wireless network at the location of the event may no longer need to satisfy the minimum conditions; the network conditions prior to deployment of the adjustment may be sufficient for non-emergency situations. Thus, in order to make the most efficient use of network resources, any adjustments made to network resources in the course of responding to the event may be reversed or undone.

In some cases, the processing system may be unable to access the PSAP or a similar data source, and may therefore be unable to confirm when the event has been resolved. In this case, the processing system may simply activate a timer upon sending the instructions in step 216. When the time expires, the processing system may send the update instructions in step 220. The duration of the timer may be configurable. In one example, the duration of the timer may vary depending upon the severity of the event. For instance, the predicted urgency level of an event may be associated with not just a set of minimum network conditions, but also a predefined timer duration specifying a minimum amount of time for which the network conditions in the geographic location of the event must satisfy the minimum conditions. The predefined timer duration may be used to control the timer when access to the PSAP or a similar database is not available.

In optional step 222 (illustrated in phantom), the processing system may store data relating to the event. Once stored, the data may be used to further train the machine learning model that is used to predict the urgency of emergency services calls and the adjustments that are to be made to adjust the current conditions of the wireless network. For instance, the machine learning model may be periodically retrained with new training data in order to learn new features from which the severity of an emergency services call can be inferred, new geographic locations and/or times from which emergency services calls may have an increased likelihood of originating, or other relationships that may help the processing system to adjust wireless network parameters to allow for better responses to emergencies.

Referring back to step 212, if the processing system concludes in step 212 that the current conditions of the wireless network at the location do satisfy the minimum conditions, then the method 200 may proceed directly to step 222 (i.e., bypassing steps 214-220). The method 200 may end in step 224.

Although not expressly specified above, one or more steps of the method 200 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, any one or more of the servers 104 or 126 or edge routers 128 or 130 of FIG. 1 (such as might be used to perform the method 200) could be implemented as illustrated in FIG. 3. As depicted in FIG. 3, the system 300 comprises a hardware processor element 302, a memory 304, a module 305 for dynamically and locally adjusting wireless network coverage in response to emergency services notifications, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for dynamically and locally adjusting wireless network coverage in response to emergency services notifications may include circuitry and/or logic for predicting the urgency levels based on data extracted from emergency services calls and for determining adjustments to network elements to exchange of further data related to the emergency services calls. The input/output devices 306 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the computer may employ a plurality of processor elements. Furthermore, although only one specific-purpose computer is shown in the Figure, if the method(s) as discussed above is implemented in a distributed or parallel manner for a particular illustrative example, i.e., the steps of the above method(s) or the entire method(s) are implemented across multiple or parallel specific-purpose computers, then the specific-purpose computer of this Figure is intended to represent each of those multiple specific-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for dynamically and locally adjusting wireless network coverage in response to emergency services notifications can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for dynamically and locally adjusting wireless network coverage in response to emergency services notifications (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:

detecting, by a processing system including at least one processor, data relating to an event for which emergency services have been requested, wherein the data includes at least one of: voice data, audio data, text data, image data, or video data;

identifying, by the processing system, a geographic location of the event, wherein the geographic location is within a coverage area of a wireless network;

predicting, by the processing system based on the data, an urgency level associated with the event;

identifying, by the processing system, a set of minimum conditions of the wireless network that is associated with the urgency level of the event;

determining, by the processing system, that current conditions of the wireless network at the location do not satisfy the minimum conditions;

determining, by the processing system, an adjustment to the wireless network that, when deployed, will cause the current conditions of the wireless network at the location to satisfy the minimum conditions; and sending, by the processing system, at least one instruction to an element of the wireless network to deploy the adjustment.

2. The method of claim 1, wherein the geographic location is provided by a base station of the wireless network through which a user endpoint device conveyed a request for the emergency services.

3. The method of claim 1, wherein the geographic location is inferred from content of the data relating to the event.

4. The method of claim 1, wherein the predicting comprises providing features extracted from the data relating to the event as inputs to a machine learning model that is trained to predict the urgency level as an output based on the features.

5. The method of claim 4, wherein the urgency level falls into one of a plurality of predefined categories, and wherein each category of the plurality of predefined categories is associated with a different urgency level of a plurality of urgency levels.

6. The method of claim 5, wherein the minimum conditions of the wireless network are mapped to a category of the plurality of predefined categories into which the urgency level falls.

7. The method of claim 6, wherein a different set of minimum conditions of the wireless network is associated with each category of the plurality of predefined categories.

8. The method of claim 1, wherein the minimum conditions of the wireless network set a threshold value for at least one key performance indicator of the wireless network.

9. The method of claim 8, wherein the at least one key performance indicator is at least one of: a minimum bandwidth, a maximum latency, a minimum radio frequency signal strength, or a maximum packet loss.

10. The method of claim 8, wherein the current conditions of the wireless network at the location comprise a currently measured value for the at least one key performance indicator.

11. The method of claim 1, wherein the adjustment comprises at least one of: adjusting an angle of an antenna of a base station of the wireless network, adjusting a tilt of the antenna, adjusting a signal direction of the antenna, or adjusting a signal strength of the antenna.

12. The method of claim 1, wherein the adjustment comprises utilizing beamforming to enhance a radio frequency signal strength in the geographic location.

13. The method of claim 1, wherein the adjustment comprises limiting incoming traffic that does not originate at the geographic location or from the emergency services at a base station of the wireless network.

14. The method of claim 1, further comprising:
determining, by the processing system, that emergency services personnel have resolved the event; and
sending, by the processing system in response to the determining that the emergency services personnel have resolved the event, an updated instruction to the element to reverse the adjustment.

15. The method of claim 14, wherein the determining that the emergency services personnel have resolved the event comprises monitoring a data source that tracks statuses of events reported to the emergency services, including a status of the event.

16. The method of claim 14, wherein the determining that the emergency services personnel have resolved the event comprises activating a timer that is set to a predefined duration upon the sending the at least one instruction and determining when the timer expires.

17. The method of claim 16, wherein the predefined duration is specific to the urgency level.

18. The method of claim 1, further comprising:
storing, by the processing system, data relating to the event.

19. A non-transitory computer-readable medium storing instructions which, when executed by a processing system including at least one processor, cause the processing system to perform operations, the operations comprising:

detecting data relating to an event for which emergency services have been requested, wherein the data includes at least one of: voice data, audio data, text data, image data, or video data;
identifying a geographic location of the event, wherein the geographic location is within a coverage area of a wireless network;
predicting, based on the data, an urgency level associated with the event;
identifying a set of minimum conditions of the wireless network that is associated with the urgency level of the event;
determining that current conditions of the wireless network at the location do not satisfy the minimum conditions;
determining an adjustment to the wireless network that, when deployed, will cause the current conditions of the wireless network at the location to satisfy the minimum conditions; and
sending at least one instruction to an element of the wireless network to deploy the adjustment.

20. A system comprising:
a processing system including at least one processor; and
a non-transitory computer-readable medium storing instructions which, when executed by the processing system, cause the processing system to perform operations, the operations comprising:
detecting data relating to an event for which emergency services have been requested, wherein the data includes at least one of: voice data, audio data, text data, image data, or video data;
identifying a geographic location of the event, wherein the geographic location is within a coverage area of a wireless network;
predicting, based on the data, an urgency level associated with the event;
identifying a set of minimum conditions of the wireless network that is associated with the urgency level of the event;
determining that current conditions of the wireless network at the location do not satisfy the minimum conditions;
determining an adjustment to the wireless network that, when deployed, will cause the current conditions of the wireless network at the location to satisfy the minimum conditions; and
sending at least one instruction to an element of the wireless network to deploy the adjustment.

\* \* \* \* \*